(12) United States Patent
Genova

(10) Patent No.: US 9,183,670 B2
(45) Date of Patent: Nov. 10, 2015

(54) MULTI-SAMPLE RESOLVING OF RE-PROJECTION OF TWO-DIMENSIONAL IMAGE

(75) Inventor: Barry M Genova, Kenmore, WA (US)

(73) Assignee: Sony Computer Entertainment America, LLC, San Mateo, CA (US)

( * ) Notice: Subject to any disclaimer, the term of this patent is extended or adjusted under 35 U.S.C. 154(b) by 82 days.

(21) Appl. No.: 12/986,872

(22) Filed: Jan. 7, 2011

(65) Prior Publication Data
US 2012/0176368 A1    Jul. 12, 2012

(51) Int. Cl.
*G06T 15/20* (2011.01)
*H04N 13/02* (2006.01)
*H04N 13/00* (2006.01)
*G09G 3/00* (2006.01)

(52) U.S. Cl.
CPC .............. *G06T 15/205* (2013.01); *G09G 3/003* (2013.01); *H04N 13/0018* (2013.01); *H04N 13/0271* (2013.01)

(58) Field of Classification Search
USPC ................................. 345/419, 424, 426, 427
See application file for complete search history.

(56) References Cited

U.S. PATENT DOCUMENTS

| | | | |
|---|---|---|---|
| 6,031,538 A | 2/2000 | Chupeau et al. | |
| 7,038,707 B2 | 5/2006 | Shimizu | |
| 8,106,924 B2 | 1/2012 | Aliprandi et al. | |
| 8,289,346 B2 | 10/2012 | Priede et al. | |
| 8,514,225 B2 | 8/2013 | Genova | |
| 2001/0053247 A1 | 12/2001 | Sowinski | |
| 2002/0080143 A1 | 6/2002 | Morgan | |
| 2005/0089212 A1 | 4/2005 | Mashitani et al. | |
| 2005/0190180 A1 | 9/2005 | Jin et al. | |
| 2005/0226538 A1 | 10/2005 | Di Federico et al. | |
| 2006/0078180 A1* | 4/2006 | Berretty et al. | 382/128 |
| 2006/0088206 A1 | 4/2006 | Era | |
| 2006/0232584 A1* | 10/2006 | Utsugi et al. | 345/426 |
| 2007/0146360 A1 | 6/2007 | Clatworthy et al. | |
| 2008/0043096 A1 | 2/2008 | Vetro et al. | |
| 2008/0085040 A1* | 4/2008 | Basu et al. | 382/128 |
| 2008/0174659 A1 | 7/2008 | McDowall | |
| 2009/0147074 A1 | 6/2009 | Getty | |

(Continued)

FOREIGN PATENT DOCUMENTS

WO    2009027691 A1    3/2009

OTHER PUBLICATIONS

De Man, Bruno, and Samit Basu. "Distance-driven projection and backprojection in three dimensions." Physics in medicine and biology 49.11 (2004): 2463.*

(Continued)

*Primary Examiner* — Stephen R Koziol
*Assistant Examiner* — Schiller Hill
(74) *Attorney, Agent, or Firm* — Joshua D. Isenberg; JDI Patent

(57) ABSTRACT

Multi-sample resolution of a re-projection of a two-dimensional image is disclosed. One or more samples of a two-dimensional image are identified for each pixel in the three-dimensional re-projection. One or more sample coverage amounts are determined for each pixel of the re-projection. Each coverage amount identifies an area of the pixel covered by the corresponding two-dimensional sample. A final value is resolved for each pixel of the re-projection by combining each two-dimensional sample associated with the pixel in accordance with its weighted sample coverage amount.

34 Claims, 10 Drawing Sheets

(56) References Cited

U.S. PATENT DOCUMENTS

| | | | |
|---|---|---|---|
| 2009/0168187 | A1 | 7/2009 | Woodgate et al. |
| 2009/0244268 | A1 | 10/2009 | Masuda et al. |
| 2009/0315996 | A1 | 12/2009 | Guler et al. |
| 2010/0073368 | A1* | 3/2010 | Kim et al. ............... 345/422 |
| 2010/0142924 | A1 | 6/2010 | Yamashita et al. |
| 2010/0215251 | A1 | 8/2010 | Gunnewiek et al. |
| 2010/0238164 | A1 | 9/2010 | Steedly et al. |
| 2010/0295853 | A1 | 11/2010 | Diamand |
| 2010/0315412 | A1 | 12/2010 | Sinha et al. |

OTHER PUBLICATIONS

Po, Lai-Man, et al. "Automatic 2D-to-3D video conversion technique based on depth-from-motion and color segmentation." Signal Processing (ICSP), 2010 IEEE 10th International Conference on. IEEE, 2010.*

Fehn "Depth-image-based rendering (DIBR), compression, and transmission for a new approach on 3D-TV." Electronic Imaging 2004. International Society for Optics and Photonics, 2004.*

PCT International Search Report mailed date Apr. 4, 2012 for PCT application No. PCT/ US11/63010.

Christopher Fehn, "A 3D-TV Approach Using Depth-Image-Based Rendering (DIBR)", Proceedings of Visualization, Imaging, and Image Processing (VIIP), Sep. 8-10, 2003, track 396-084.

Voicu Popescu, "Forward Rasterization: A Reconstruction Algorithm for Image-Based Rendering", Doctoral Thesis, Department of Department of Computer Science University of North Carolina, Chapel Hill, May 2001.

Voicu Popescu et al. "High Quality 3D Image Warping by Separating Visibility from Reconstruction", 1999.

U.S. Appl. No. 12/986,814, to Barry Genova and Michael Guttmann, entitled "Dynamic Adjustment of Predetermined Three-Dimensional Re-Projection Settings Based on Scene Content", filed Jan. 7, 2011.

U.S. Appl. No. 12/986,827, to Barry Genova, entitled "Scaling Pixel Depth Values of User-Controlled Virtual Object in Threedimensional Scene", filed Jan. 7, 2011.

U.S. Appl. No. 12/986,854, to Barry Genova and Tobias Berghoff, entitled "Morphological Anti-Aliasing (MLAA) of a Re-Projection of a Two-Dimensional Image", filed Jan. 7, 2011.

Office Action of Oct. 26, 2012 for U.S. Appl. No. 12/986,827 filed Jan. 7, 2011.

Office Action of Apr. 4, 2013 for U.S. Appl. No. 12/986,814, filed Jan. 7, 2011.

Office Action of May 7, 2013 for U.S. Appl. No. 12/986,854, filed Jan. 7, 2011.

Final Office Action dated Aug. 8, 2013 for U.S. Appl. No. 12/986,814, filed Jan. 7, 2011.

Notice of Allowance for U.S. Appl. No. 12/986,854 dated Aug. 23, 2013.

Reshetov, Alexander Intel Labs. "Morphological antialiasing." 'Proceedings of the Conference on High Performance Graphics 2009. pp. 109-116. ACM New York, NY, USA © 2009.

U.S. Appl. No. 14/038,616, to Barry M. Genova, filed Sep. 26, 2013.

Non-Final Office Action for U.S. Appl. No. 12/986,814, dated Mar. 6, 2014.

Non-Final Office Action for U.S. Appl. No. 14/038,616, dated May 16, 2014.

Final Office Action for U.S. Appl. No. 12/986,814, dated Sep. 18, 2014.

Non-Final Office Action for U.S. Appl. No. 14/038,616, dated Nov. 19, 2014.

* cited by examiner

800

801

INSTRUCTIONS FOR MULTI-SAMPLE RESOLVING OF THREE-DIMENSIONAL RE-PROJECTION OF TWO-DIMENSIONAL SCENE

IDENTIFYING TWO-DIMENSIONAL SAMPLE INSTRUCTIONS
803

DETERMINING SAMPLE COVERAGE AMOUNT INSTRUCTIONS
805

RESOLVING FINAL PIXEL VALUE INSTRUCTIONS
807

HOLE-FILLING INSTRUCTIONS
(optional)
808

DISPLAYING THREE-DIMENSIONAL RE-PROJECTION INSTRUCTIONS
809

FIG. 8

MULTI-SAMPLE RESOLVING OF RE-PROJECTION OF TWO-DIMENSIONAL IMAGE

CROSS REFERENCE TO RELATED APPLICATIONS

This application is related to commonly-assigned co-pending application Ser. No. 12/986,814, entitled "DYNAMIC ADJUSTMENT OF PREDETERMINED THREE-DIMENSIONAL RE-PROJECTION SETTINGS BASED ON SCENE CONTENT", filed the same date as the present application.

This application is related to commonly-assigned co-pending application Ser. No. 12/986,827, entitled "SCALING PIXEL DEPTH VALUES OF USER-CONTROLLED VIRTUAL OBJECT IN THREE-DIMENSIONAL SCENE", filed the same date as the present application.

This application is related to commonly-assigned co-pending application Ser. No. 12/986,854, entitled "MORPHOLOGICAL ANTI-ALIASING (MLAA) OF A RE-PROJECTION OF A TWO-DIMENSIONAL IMAGE", filed the same date as the present application.

FIELD OF THE INVENTION

Embodiments of the present invention are related to a method for multi-sample resolving of a three-dimensional re-projection of a two-dimensional image.

BACKGROUND OF THE INVENTION

The ability to perceive two-dimensional images in three-dimensions by way of numerous different technologies has grown quite popular over the past few years. Providing an aspect of depth to two-dimensional images potentially creates a greater sense of realism to any depicted scene. This introduction of three-dimensional visual representation has greatly enhanced viewer experiences, especially in the realm of video games.

A number of techniques exist for the three-dimensional rendering of a given image. Most recently, a technique for projecting a two-dimensional image(s) into three-dimensional space known as depth-image-based rendering (DIBR) has been proposed. In contrast to former proposals, which often relied on the basic concept of "stereoscopic" video, i.e., the capturing, transmission, and display of two separate video streams—one for the left eye and one for the right eye-, this new idea is based on a more flexible joint transmission of monoscopic video (i.e., single video stream) and associated per-pixel depth information. From this data representation, one or more "virtual" views of the 3-D scene can then be generated in real-time at the receiver side by means of so-called DIBR techniques. This new approach to three-dimensional image rendering presents several advantages over previous approaches.

There are generally two ways to present two separate images to a viewer to create the illusion of depth. In a system commonly used for projection of 3D images onto a screen there are two separate synchronized projectors for the left-eye and right-eye images. The images for both eyes are projected onto a screen simultaneously but with orthogonal polarizations, e.g., vertical polarization for the left-eye image and horizontal polarization for the right eye image. The viewer wears a special pair of polarized 3D-viewing glasses having appropriately polarized lenses for the left and right eyes (e.g., vertically polarized for the left eye and horizontally polarized for the right eye). Because of the polarization of the images and the lenses, the viewer perceives only the left eye image with the left eye and only the right eye image with the right eye. The degree of the illusion of depth is partly a function of the offset between the two images on the screen.

In 3D video systems, the left-eye and right eye images are displayed by a video display screen but not exactly simultaneously. Instead, the left-eye and right-eye images are displayed in an alternating fashion. The viewer wears a pair of active shutter glasses that shutter the left eye when the right-eye image is displayed and vice versa.

The experience of 3-D video can depend somewhat on the peculiarities of human vision. For example, the human eye has a discrete number of light receptors, yet humans do not discern any pixels, even in peripheral vision. What is even more amazing is that the number of color-sensitive cones in the human retina can differ dramatically among individuals—by up to a factor of 40. In spite of this, people appear to perceive colors the same way—we essentially see with our brains. The human vision system also has an ability to ascertain alignment of objects at a fraction of a cone width (hyperacuity). This explains why spatial aliasing artifacts (i.e., visual irregularities) are more noticeable than color errors.

Realizing this fact, graphics hardware vendors put significant efforts in compensating for aliasing artifacts by trading color accuracy for spatial continuity. Multiple techniques are supported in hardware, based on mixing weighted color samples, similar to the integrating property of digital cameras.

Of course, any aliasing artifact will eventually disappear with an increase in display resolution and sampling rates. Aliasing artifacts can also be handled at lower resolutions, by computing and averaging multiple samples per pixel. Still, for most image-rendering algorithms these solutions might not be very practical, given hardware constraints.

It is within this context that embodiments of the present invention arise.

BRIEF DESCRIPTION OF THE DRAWINGS

FIG. 8 illustrates an example of a non-transitory computer-readable storage medium with instructions for implementing multi-sample resolving of a three-dimensional re-projection of a two-dimensional image according to an embodiment of the present invention.

DETAILED DESCRIPTION

Introduction

A three-dimensional re-projection of a two-dimensional image may be viewed by displaying two separate views of the image (i.e., one to each eye), such that a viewer perceives the illusion of depth. When looking at a three-dimensional image, the left eye and right eye will converge two corresponding pixels (i.e., left eye pixel and right eye pixel) in order to simulate a single pixel with depth.

FIGS. 1A-1D are schematic diagrams illustrating the effect that the distance between corresponding pixels will have on the viewer's perceived depth. The pixel size is a fixed boundary imposed by the resolution displayed, which is inevitably limited by the hardware in the visual display (e.g., three-dimensional television). As the corresponding pixel separation increases, the perceived depth location gets progressively farther away from the screen.

Figure 1A:
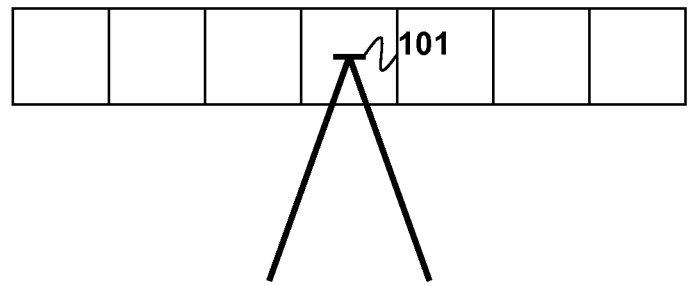
FIGS. 1A-1D are schematic diagrams illustrating the effect that the distance between corresponding three-dimensional pixels will have on the viewer's perceived depth.
Figure 1B:
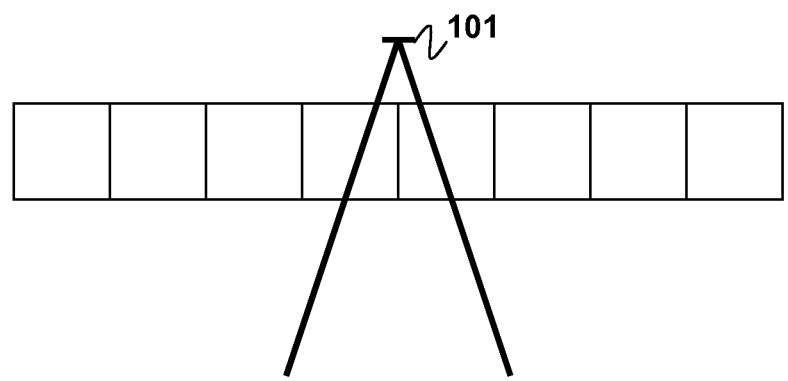
Figure 1C:
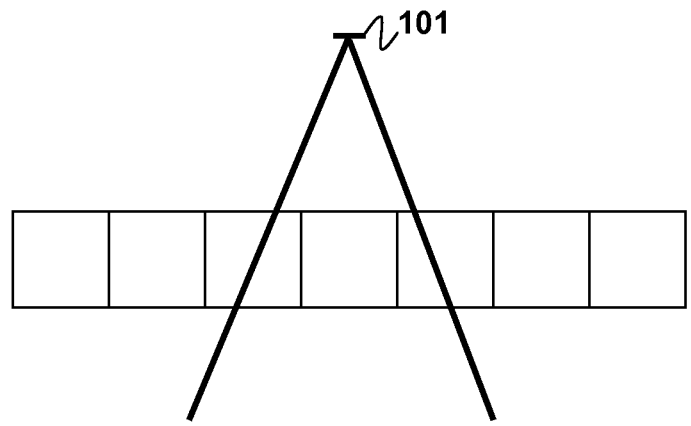
Figure 1D:
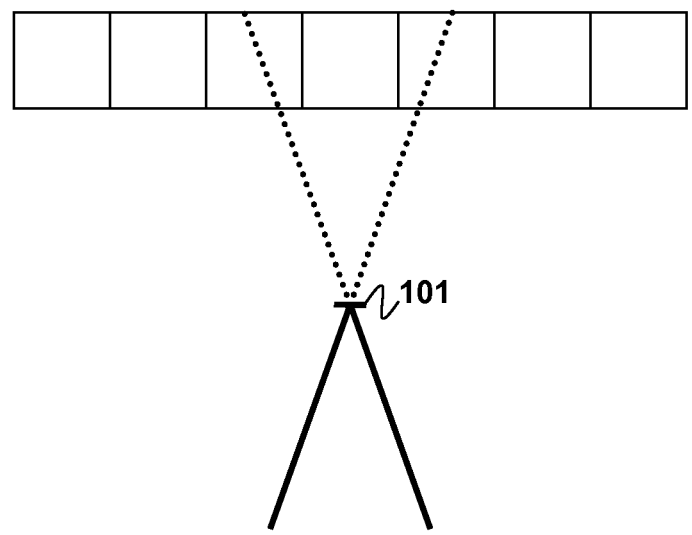

FIG. 1A depicts two corresponding pixels that overlap. These two pixels will create a perceived depth 101 that sits at the surface of a screen (e.g., visual display). As the corresponding pixels grow apart in FIG. 1B (i.e., situated proximate each other), the perceived depth 101 intensifies and sits at a distance slightly into the screen. As the corresponding pixels grow even further apart in FIG. 1C (i.e., separated by a pixel width), the perceived depth 101 seems to sit even further into the screen. By having the left-eye pixel to the right of the right eye pixel in FIG. 1D, the perceived depth will appear closer than the screen. It is important to note that the perceived depth is not linearly proportional to the distance between corresponding pixels. As such, a small increase in corresponding pixel separation may lead to a significant increase in perceived depth associated with those corresponding pixels.

Figure 2A:
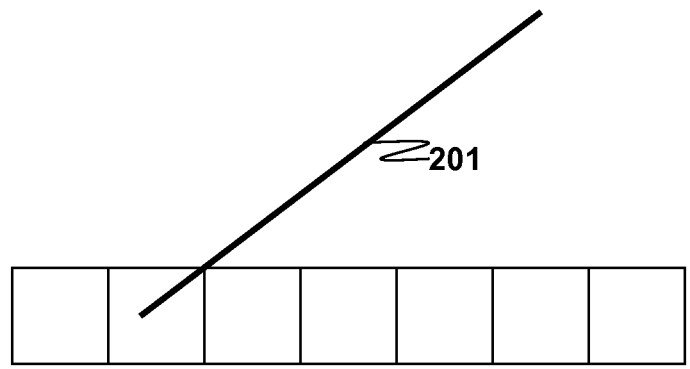
FIGS. 2A-2C are schematic diagrams illustrating the effect of depth tearing in a three-dimensional re-projection of a two-dimensional image.
Figure 2B:
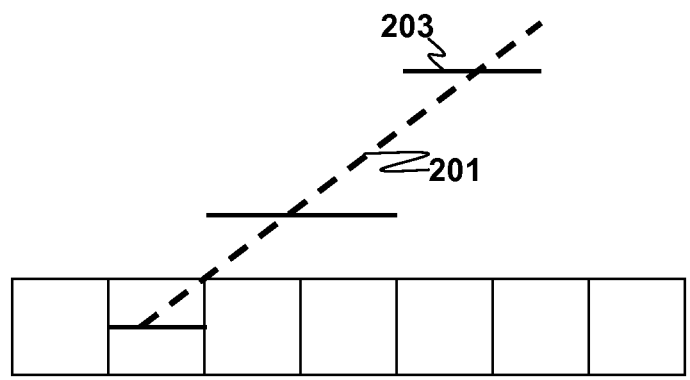
Figure 2C:
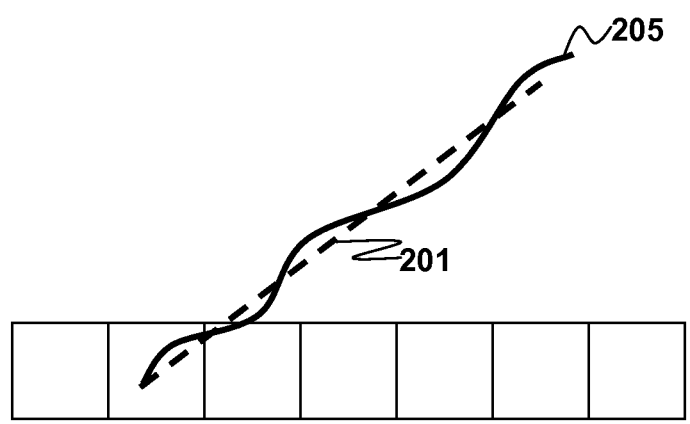

The interplay between corresponding pixel separation and perceived pixel depth makes smooth transitions of depth values rather difficult. This is because each pair of corresponding pixels is projected to a specific depth plane determined by the separation between the pixels. FIG. 2A-2C are schematic diagrams illustrating this effect, which will be referred to herein as depth tearing.

The three-dimensional visual artifact known as depth tearing occurs when trying to position a three-dimensional element 201 with a sloped depth as illustrated in FIG. 2A. Rather than perceiving the element 201 as being situated on a single diagonal plane, the element will likely be perceived as being situated on multiple planes 203 that are parallel to the screen as illustrated in FIG. 2B.

In an ideal situation, simply increasing the resolution of the image being displayed would solve the issue of depth tearing. However, because the process of three-dimensional re-projection is limited by hardware constraints, this solution is impractical. Instead, the effects of depth tearing are minimized by mixing/blending the colors or other pixel values of neighboring three-dimensional pixels. What results is a muted waveform 205 rather than a straight diagonal plane as illustrated in FIG. 2C. While imperfect, this provides the viewer with a much more natural looking three-dimensional image.

In order to blend three-dimensional pixels to create smoother depth planes, an anti-aliasing solution is used. Prior art anti-aliasing solutions include temporal anti-aliasing, which require the storage of additional buffered data. For example, in the case of 3D images this means storing either a pre re-projected color and depth buffer or the two color buffers of the left-eye and right-eye images. For 720 P images this requires memory space for about 7 megabytes of data. Considering that 3D games already need increased storage buffers for the second eye image, this just makes the already high memory pressure worse.

Another prior art solution known as full screen anti-aliasing (FSAA) also requires larger buffers and increasing the memory pressure. FSAA essentially involves just increasing the resolution and then applying a smart downsample. In addition to still having depth tearing, the big issue is the decreased performance of the higher resolution.

An additional solution is known as multi sampling anti-aliasing (MSAA), which is similar to FSAA but the work to select the color value is done at a lower resolution than the sample resolution. This results in a much cheaper implementation in terms of processing load and memory. Typically MSAA requires the resolve to be done before further work is done on the image. Usually this means that, due to post processing of the source image, all additional sample data has been lost by the time re-projection is applied. Even if the sample information is saved, there is depth tearing in it (due to the fixed sample locations already discussed). The memory requirements for FSAA and MSAA are more transient than temporal anti-aliasing.

FIG. 3A-3D illustrate a prior art multi-sampling anti-aliasing method for multi-sampling along with the problems associated with the prior art. Each three-dimensional pixel of a three-dimensional image (i.e., left view or right view) may be represented with a bucket. Typically a pixel bucket will contain only a single sample. By way of example, and not by way of limitation, this sample may be a pixel, sub-pixel, or any group of pixels from the corresponding two-dimensional image to be re-projected in three-dimensions. A sample may be characterized by a set of values that describe its color profile. As such, in a re-projection scheme that does not implement multi-sampling, the color profile of a three-dimensional pixel may be characterized by the single sample it contains.

Figure 3A:
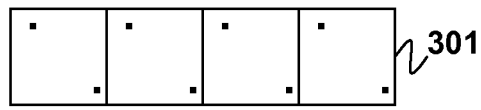
FIGS. 3A-3D are schematic diagrams illustrating a method for multi-sample resolving of a three-dimensional re-projection of a two-dimensional image according to the prior art.

In multi-sampling, each pixel bucket is allowed to contain more than one sample. In a typical multi-sampling scheme, sample locations are assigned within a three-dimensional pixel and a sample is written to that location if it is covered by the currently rendering geometry. FIG. 3A illustrates a row of three-dimensional pixels 301 implementing 2× multi-sampling. The black dots represent the sample locations assigned each three-dimensional pixel 301 to be used during multi-sampling. In 2× multi-sampling, each three-dimensional pixel 301 may be characterized by up to 2 samples from the corresponding two-dimensional image. While the example shown is limited to using two samples per three-dimensional pixel, it is important to note that any number of samples may be used in a multi-sampling scheme. Moreover, depending on the re-projection shift direction, the samples may be derived from any direction. If the re-projection shift occurs only in the horizontal direction (i.e., using parallel-shifted cameras), samples may be derived from a horizontal scan of the two-dimensional image. This technique requires relatively little memory overhead since only one scanline needs to be stored at a time.

Multi-sampling assigns samples from a two-dimensional image to sample locations for each pixel in a three-dimensional re-projection. However, the actual process of combining multiple samples to obtain a single color profile is known as resolving. Both steps are necessary to achieve the muted waveform for diagonal planes described above. The typical resolving process assumes that the coverage of each sample is proportional to the total number of samples per three-dimensional pixel. Thus, in 2× multi-sampling/resolving, each sample in a given three-dimensional pixel is given 50% weight, and the values are added together. So if the left sample is 100% red and the right sample is 100% blue, the three-dimensional pixel will assume a color profile that is 50% red and 50% blue (or some sort of purple color). Similarly, if we are dealing with 4× multi-sampling/resolving, each sample will carry a 25% weight. Other blend combinations may be used but are based off the fixed location of the sample point from the pixel being resolved.

Figure 3B:
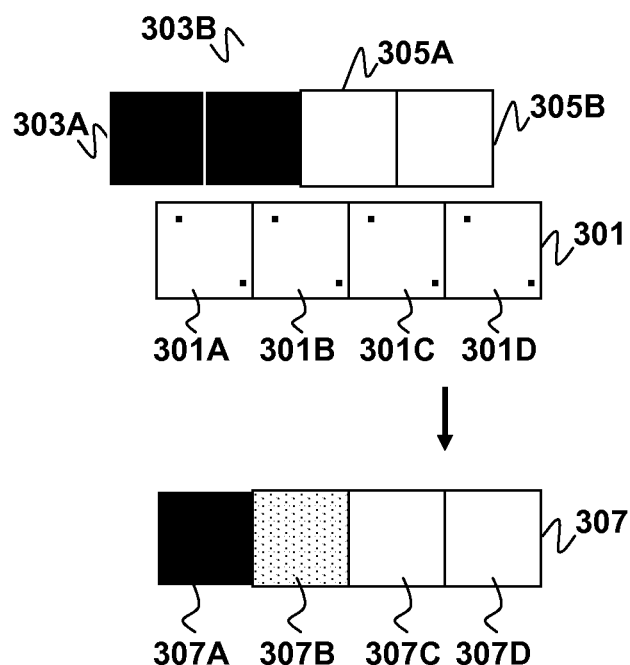
Figure 3C:
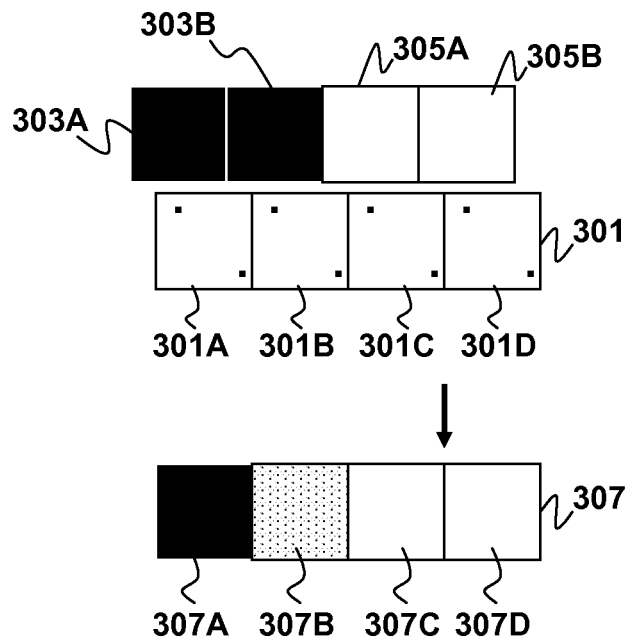
Figure 3D:
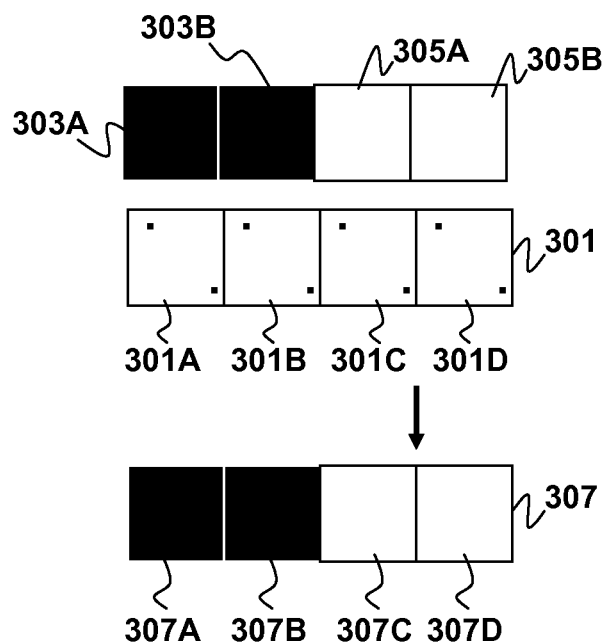

The problem with the prior art method of multi-sampling lies with the actual position of sample locations within a given three-dimensional pixel. FIG. 3B-D illustrate this problem in the context of 2× multi-sampling/resolving. In our example, each sample from the two-dimensional image will be an individual pixel from that two-dimensional image. Each pixel of the three-dimensional re-projection 301 may be represented by up to two different samples. The sample locations within each three-dimensional pixel are fixed.

In FIG. 3B, two black pixel samples 303A, 303B are followed by two white pixel samples 305A, 305B in the two-dimensional image, being re-projected to the right. A first black pixel 303A covers the left sample location in the first (left-most) re-projection pixel 301A in the row 301. A second black pixel 303B covers the right sample location in the first re-projection pixel and the left sample location in the second re-projection pixel 301B. The first white pixel 305A covers the right sample location of the second re-projection pixel 301B and the left sample location in the third re-projection pixel 301C. The second white pixel 305B covers the right sample location in the third re-projection pixel 301C and the left sample location in the fourth re-projection pixel 301D. For the purposes of this example, the right sample location of the fourth re-projection pixel 301D may be assigned an initial value, (e.g., no color, or white) because it is not assigned a corresponding pixel value from the two-dimensional image. Giving each sample location a 50% weight results in the first re-projection pixel 307A, yielding black since both sample locations for this pixel are covered by black pixel values. The second re-projection pixel 307B is resolved to grey (i.e., 50% white and 50% black) because one sample location for this pixel is covered by a black pixel and the other is covered by a white pixel. The third re-projection pixel 307C in the resolved pixel row 307 is resolved to white since both sample locations for this pixel are covered by white pixel values. The fourth re-projection pixel 307D in the resolved pixel row 307 is resolved to white since one sample location is covered by a white pixel 307D and, in this example, the other sample location has been initialized to a value of white. It is noted that in typical MSAA implementations, all sample points need to be covered with some initial value, e.g., black, white or grey. Specifically, if the buffer is initially cleared to white then the white pixel samples 305A, 305B can be ignored.

In FIG. 3C, the pixels 303A, 303B, 305A, 305B have been shifted slightly to the right. However, the shift is small enough that the coverage of the sample locations in the row 301 has not changed. Specifically, the sample locations in the first re-projection pixel 301A are covered by black pixels 303A, 303B, the sample locations in the second re-projection pixel are covered by black pixel 303B and white pixels 305A, the sample locations in the third re-projection pixel 301C are covered by white pixels 305A, 305B, and one sample location in the fourth pixel 301D is covered by a white pixels 305B and the other is not covered and initialized to white. As a result the pixels 307A, 307B, 307C, and 307D in the resolved pixel row 307 again resolve to black, grey, white, and white respectively, as in FIG. 3B. Because the re-projection pixels 301A, 301B, 301C, and 301D have fixed sample locations, small shifts in re-projection of the two-dimensional image will not alter the value profile of the re-projection pixels as the two-dimensional pixels 303A, 303B, 305A, 305B shift to the right.

However, if the two-dimensional pixels 303A, 303B, 305A, 305B shift slightly further to the right than in FIG. 3C, the coverage of the sample locations in the re-projection pixels 301A, 301B, 301C, and 301D changes abruptly. Specifically, as shown in FIG. 3D, as a result of a slight shift to the right, both sample locations in the first and second re-projection pixels 301A, 301B are now covered respectively by black pixels 303A, 303B, both sample locations in the third and fourth re-projection pixels 301C, 301D are covered respectively by white pixels 305A, 305B. As a result, the first two resolved re-projection pixels 307A, 307B are resolved to black and the second two resolved re-projection pixels 307C, 307D are resolved to white.

FIG. 3B-3D demonstrate that in the typical 2× multi-sampling/resolving scheme, there will only be a value difference in the resolved pixels when there has been a discrete shift in re-projection of the two-dimensional image. Rather than allowing the value of a resolved three-dimensional pixel to transform gradually with each gradual shift in re-projection, the typical multi-sampling/resolving method only allows for discrete shifts in three-dimensional pixel values, such as color values. Because human eyes can match up colors quite accurately, this results in an increase in perceived depth planes (i.e., more depth tearing).

Increasing the sample count will allow for a more gradual transition of three-dimensional pixel value profile, while also leading to a greater number of depth planes being perceived by the viewer. The visual artifact is not too bad in a single scanline (the viewer just perceives that the whole section has shifted slightly). However, in a full image where multiple scanlines are used, the problem is amplified. With multiple scanlines the viewer may notice one line shifting depth, while another line remains at the same depth.

Greatly increasing the number of sample locations per three-dimensional pixel will reduce the number of visual artifacts perceived by the viewer. However, increasing the sample count significantly is not feasible because of a system's memory constraints. For example, a typical 720 p buffer using RGBA costs roughly 3.5 M. Adding a second sample location to the three-dimensional pixel doubles that the amount of memory required.

Embodiments of the present invention seek to limit the number of two-dimensional samples needed for a given three-dimensional pixel, while also creating a more gradual transition in three-dimensional pixel color profile for shifts in re-projection. Embodiments of the present invention can use more than two samples. However, it has been observed that embodiments with re-projection shifting only in the horizontal direction the visual improvement was negligible when four samples were used instead of two. Without being limited by any theory of operation, this may be due to the fact that in the embodiment tested all pixels were the same size when re-projected. In a typical scene there are few patterns of samples that won't overlap in such a way that it would be necessary to keep more than two samples in the case where we allowed for a maximum of 4 samples. Embodiments that re-project pixels both horizontally and vertically may yield improved visual quality using more than two samples. In embodiments of the present invention, pixel values for each pixel in the three-dimensional re-projection are computed based on the amount of "coverage" of the corresponding samples. In effect, the coverage amounts can be used to determine the weight to apply to each two-dimensional sample value when calculating the corresponding three-dimensional pixel value in the re-projection.

Embodiments

Figure 4:
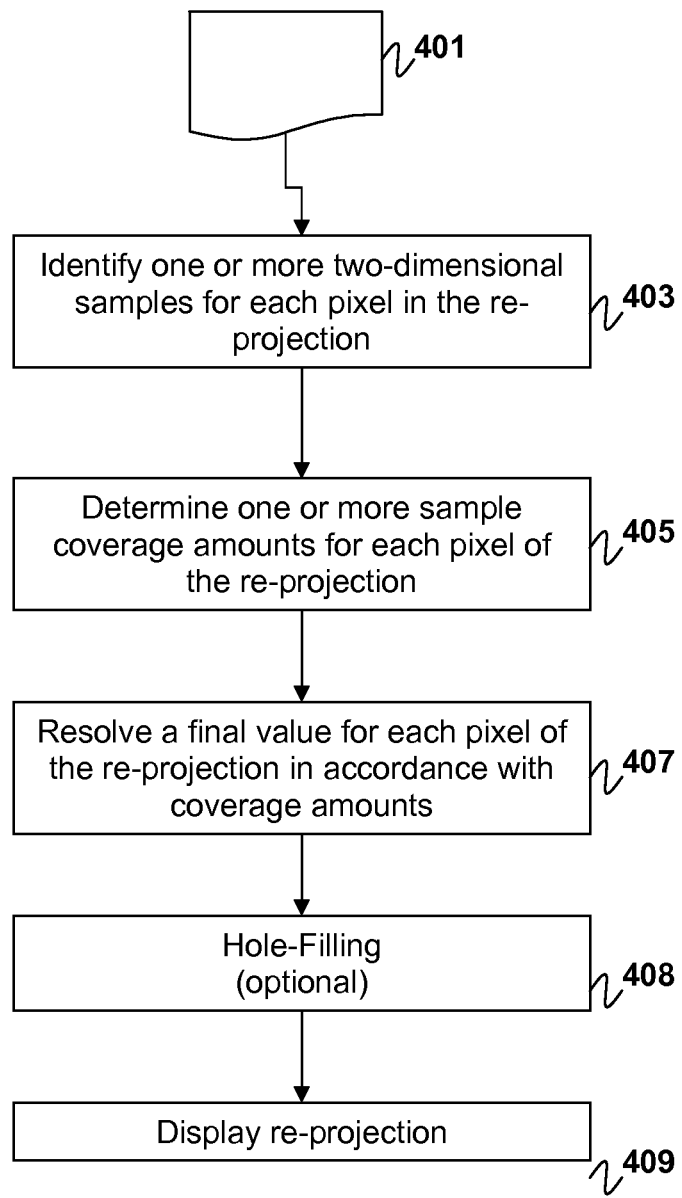
FIG. 4 is a flow diagram illustrating a method for multi-sample resolving of a three-dimensional re-projection of a two-dimensional image according to an embodiment of the present invention.

FIG. 4 is a flow diagram illustrating a method for multi-sample resolving of a three-dimensional re-projection of a two dimensional image according to an embodiment of the present invention. Before a two-dimensional image 401 is re-projected in three-dimensions, samples must be identified for use with corresponding three-dimensional pixels 403. A three-dimensional re-projection is really a combination of multiple separate views (i.e. right eye view and left eye view) that converge to create the illusion of depth. For each view of the three-dimensional re-projection, it must first be determined which two-dimensional samples correspond to each three-dimensional pixel for that particular view. As discussed above, a sample refers to a pixel, sub-pixel, or any other group of pixels within a two-dimensional image. A three-dimensional pixel may be characterized by any number of samples depending on the type of re-projection being performed on the two-dimensional image. Also, any two-dimensional sample may overlap more than one three-dimensional pixel.

Since there may be more than a maximum allowable number of samples per three-dimensional pixel there could be a choice of which samples to use. When re-projecting, the samples could be chosen to keep foreground objects. This can be done with a depth test for each sample or in the parallel shifted camera case, selecting a specific traversal order of the two-dimensional pixel samples to allow for keeping an initial or last sample written. Keeping multiple samples can be achieved by selecting via typical cache eviction policies such as FIFO.

To allow for simple selection of the samples, in our embodiment, we designate two types of samples: 'leading' and 'trailing' samples. A leading sample is a sample that crosses the left edge of the three-dimensional pixel. Likewise, a trailing sample touches or crosses the right edge of the three-dimensional pixel. This categorizes a sample that crosses neither edge as a trailing sample. In embodiments where the width of a two-dimensional pixel is the same width as a three-dimensional pixel when re-projected it is guaranteed to be touching or crossing an edge. It is noted that other embodiments need not require that the width of a two-dimensional pixel be the same as that of a pixel in the re-projection. By way of example, in FIG. 5A, black pixel sample 503 is a trailing sample in the first pixel of pixel row 501 and a leading sample in the second pixel in the row. In the cases where four samples are used multiple leading and multiple trailing samples can be kept and the coverage amounts can be adjusted based on the other leading and trailing samples. It is has been observed that doing so had little visual impact.

Once it has been determined which two-dimensional samples correspond to each three-dimensional pixel, sample coverage amounts for each sample must be determined 405. A sample coverage amount refers to the area of the pixel covered by the corresponding two-dimensional sample. Depending on the re-projection shift direction, the samples may be derived from any direction. By way of example and not by way of limitation, a three-dimensional re-projection system that uses parallel shifted cameras will derive samples from a horizontal direction scan of the two-dimensional image since the re-projection shift occurs only in the horizontal direction. In contrast to the prior art, where sample locations were used to resolve a three-dimensional pixel value, embodiments of the present invention track the actual coverage amount of each sample associated with a given three-dimensional pixel. The coverage amount of one sample may be impacted by another sample. The primary occurrences of this will come from overlapping samples. As the depth value will usually be different between two two-dimensional pixels being re-projected often the pixels will overlap. As mentioned above information about foreground objects is usually more important than background objects.

It is noted that identifying the samples at 403 and determining the coverage amounts at 405 may occur at the same time, and selection of samples may be based on coverage amount (such as opting to keep a sample that has a higher coverage amount.)

Figure 5A:
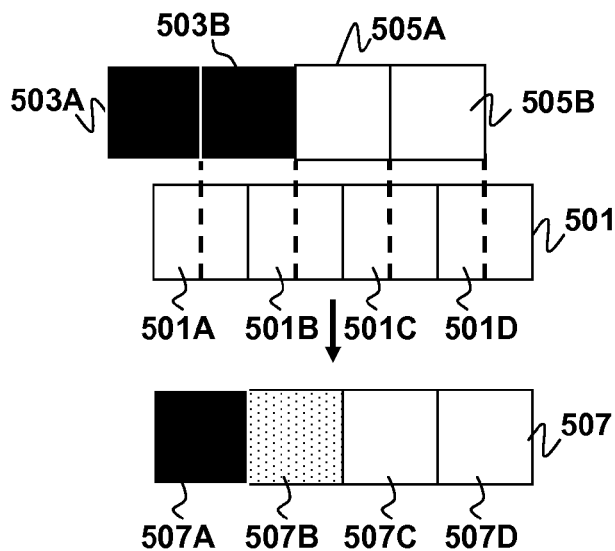
FIGS. 5A-5B are schematic diagrams illustrating a method for multi-sample resolving of a three-dimensional re-projection of a two-dimensional image according to an embodiment of the present invention.
Figure 5B:
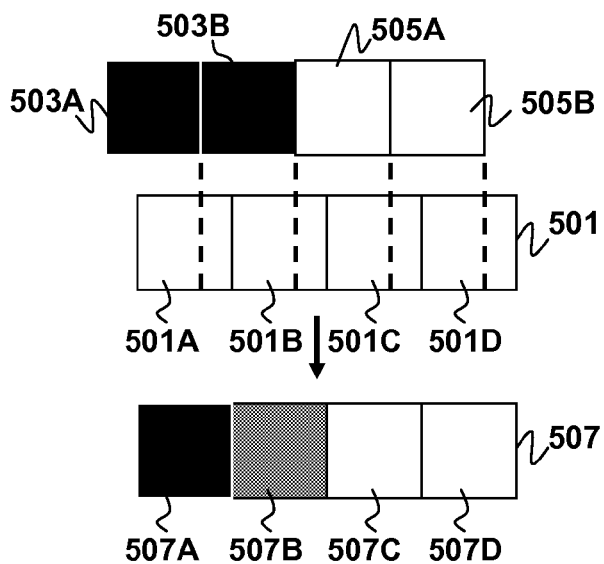
Figure 5C:
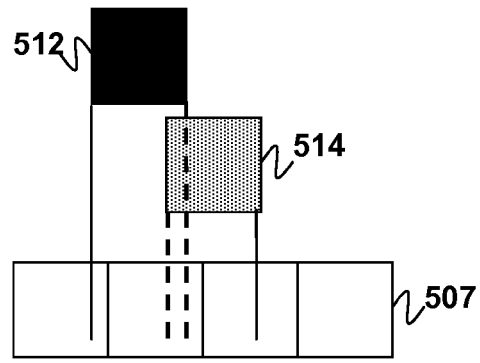
FIG. 5C is a schematic diagram illustrating overlap between pixel samples in multi-sample resolving of a three-dimensional re-projection of a two-dimensional image according to an embodiment of the present invention.

FIG. 5C illustrates the effect of overlap of two different samples 512, 514 and the concept of "leading" and "trailing" samples. The area between the two dashed lines represents the area of overlap between the two samples. The black sample 512 is a leading sample for the second pixel in the row 501. The grey sample 514 is a trailing sample for the second pixel. In the example depicted in FIG. 5C, the grey sample 514 also represents a sample that is closer to the viewer. In this case the coverage of the black leading sample 512 can be reduced by the amount of coverage overlap with the grey sample. It is possible for one sample's coverage to completely eliminate another sample (or reduce the other sample's coverage to zero.)

After determining the coverage amounts for all samples corresponding to all three-dimensional pixels, final pixel value (e.g., color) resolving in accordance with those coverage amounts may be performed 407. For a given three-dimensional pixel, each sample corresponding to that pixel will be weighted according to its coverage amount and then combined to produce a final pixel value. The final pixel value can be a final value for any channel of data that is used to define a pixel in an image. By way of example, and not by way of limitation, the final pixel value may be a final color value. However, embodiments of the invention are not limited to implementations in which the final value is a color value.

In the case where the weights of the samples used to resolve a final pixel value do not total 100% typical re-projection hole-filling can occur. By way of example, and not by way of limitation, the coverage amounts can be divided by the total coverage of the three-dimensional pixel which helps to balance any gaps. If there are no samples at all for a given three-dimensional pixel, such a pixel may be allowed to pass through for hole-filling. In certain embodiments, the method shown in FIG. 4 may include an optional hole-filling step, indicated at 408. In general, the hole-filling can adjust the final value for any pixel for which the total weighted coverage amounts for all samples that contributed to that final value is less than 100%. By way of example, and not by way of limitation, in the hole-filling step, may involve copying the neighbor pixel background values to the given pixel since that is usually less noticeable. In some implementations, this can be done as part of the final pixel value resolving at 407 via specific processing order during the resolve.

Once the three-dimensional pixel values have been resolved for the three-dimensional re-projection, the re-projected image can be displayed, as indicated at 409.

It is noted that the coverage amounts for the samples can be stored temporarily in a number of different ways. By way of example, the coverage values can be stored in arrays. For instance, in the case of RGBA data stored as a 32 bit value, there would be two 32 bit values per re-projection pixel (since two samples are used.) This does not preclude embodiments of the invention from using lists or indexes to reduce memory overhead. However, with two samples lists might be more likely to introduce additional overhead and not reduce. This could be overcome, e.g., by using variable-sized lists.

It is noted that in the case of three-dimensional stereoscopic left-eye and right-eye images, the pixel values for the left-eye and right-eye images can be resolved as described in FIG. 4. In this case there is a separate set of samples for each re-projection target (i.e.: left eye and right eye) and each target needs to be resolved independently. For performance both targets can be resolved at the same time, but still independently. It is noted that pixel values for autostereoscopic images (e.g., interlaced images from different views as used in lenticular lens array displays) can also be resolved independently. If desired, such images can independently be resolved simultaneously, e.g., using a suitably configured parallel processing system and software.

The left-eye and right-eye images can be displayed sequentially or simultaneously depending on the nature of the display. For example, the left-eye and right-eye images may be displayed sequentially in the case of a 3D television display used with active shutter glasses. Alternatively, the left-eye and right-eye images may be displayed simultaneously in the case of a dual-projection type display used with passive 3D viewing glasses having differently colored or differently polarized left-eye and right-eye lenses.

FIGS. 5A-5B further illustrate the use of coverage in multi-sample resolving of a three-dimensional re-projection of a two-dimensional image. By way of example, and not by way of limitation, FIG. 5A-B illustrate a method for 2× multi-sample resolving of a three-dimensional re-projection of a two-dimensional image according to an embodiment of the present invention. In 2× multi-sampling, a given re-projection pixel in a row 501 may have up to two two-dimensional samples associated with it. In FIG. 5A, two black pixel samples 503A, 503B are followed immediately by two white pixel samples 505A, 505B in the two-dimensional image, being re-projected to the right. It is noted that in re-projection of a typical scene it is reasonable to expect that most pixels will not shift such that they remain abutted to an adjacent pixel. Some overlap of the shifted pixels is allowed as are gaps between the shifted pixels. The coverage amount of each two-dimensional sample 503A, 503B, 505A, 505B is then determined. In the example shown in FIG. 5A, the first black sample 503A has 50% coverage in the first re-projection pixel 501A. The second black sample 503B has 50% coverage in the first re-projection pixel 501A and 50% coverage of the second re-projection pixel 501B. The first white sample 505A has 50% coverage in second re-projection pixel 501B and 50% coverage in the third re-projection pixel 501C. The second white sample 505B has 50% coverage in the third three-dimensional pixel 501C and 50% coverage of the fourth re-projection pixel 501D. For the purposes of this example, it is assumed that the re-projection pixels have been initialized to have no samples, or zero coverage. Using coverage amounts as weights and applying the total coverage divide described above to the fourth re-projection pixel, we obtain resolved re-projection pixels 507A, 507B, 507C, 507D in the resolved re-projection row 507 having values of black, grey, white, and white, respectively.

However, the situation is different if the coverage is only slightly different. Specifically, in FIG. 5B, the two-dimensional pixels 503A, 503B, 505A, 505B are re-projected further to the right resulting in different coverage amounts for the two-dimensional pixels 503A, 503B, 505A, and 505B. In the example depicted in FIG. 5B these coverages are as follows. The first black sample 503A has 75% coverage in the first re-projection pixel 501A. The second black sample 503B has 25% coverage in the first re-projection pixel 501A and 75% coverage of the second re-projection pixel 501B. The first white sample 505A has 25% coverage in second re-projection pixel 501B and 75% coverage in the third re-projection pixel 501C. The second white sample 505B has 25% coverage in the third three-dimensional pixel 501C and 75% coverage of the fourth re-projection pixel 501D. Again, for the purposes of this example, it is assumed that the re-projection pixels (including the fourth re-projection pixel 501D) are initialized to have no samples, or zero coverage. Using coverage amounts as weights and applying the total coverage divide to the fourth re-projection pixel, we obtain resolved re-projection pixels 507A, 507B, 507C, 507D in the resolved re-projection row 507 having values of black, dark grey, white, and white, respectively. The darker grey value for the second resolved re-projection pixel 507B is the result of the higher percentage coverage of the second re-projection pixel 501B by the black pixel 503B compared to the white pixel 505A.

Whereas the prior art method relied on sample locations within a three-dimensional pixel to determine final three-dimensional pixel value, the invented method looks at sample coverage of a three-dimensional pixel in resolving its final color. This allows for a more accurate resolving step when compared to the prior art. As discussed above, the prior art only allows for pixel value transitions for three-dimensional pixels where discrete shifts in re-projection have occurred. The invented method, on the other hand, resolves each three-dimensional pixel's final value using sample coverage amounts, which allows for smooth color transitions that are responsive to any shift in re-projection.

Thus, embodiments of the present invention not only solve the problem of depth tearing during three-dimensional re-projection, but also produce more natural looking three-dimensional images.

In the case of using an autostereoscopic display, such as a lenticular lens array to display the final three-dimensional image, it is expected that the amount of shift between each viewpoints corresponding images and another viewpoints images will be fairly small. Embodiments of the present invention also help reduce the perceived jump while moving between viewpoints. In prior art 3D systems different objects tend to "snap" to their locations while the viewer is changing between the different viewpoints. Embodiments of the present invention allow for a more natural shift of all the objects in a three-dimensional scene as the viewer shifts position.

It is noted that FIGS. 5A-5B depict an example where the samples 503, 505 are shifted horizontally, but not vertically relative to the three-dimensional pixels 501. However, embodiments of the invention may include implementations where the samples are shifted vertically, or where the samples are shifted both vertically and horizontally.

Figure 6:
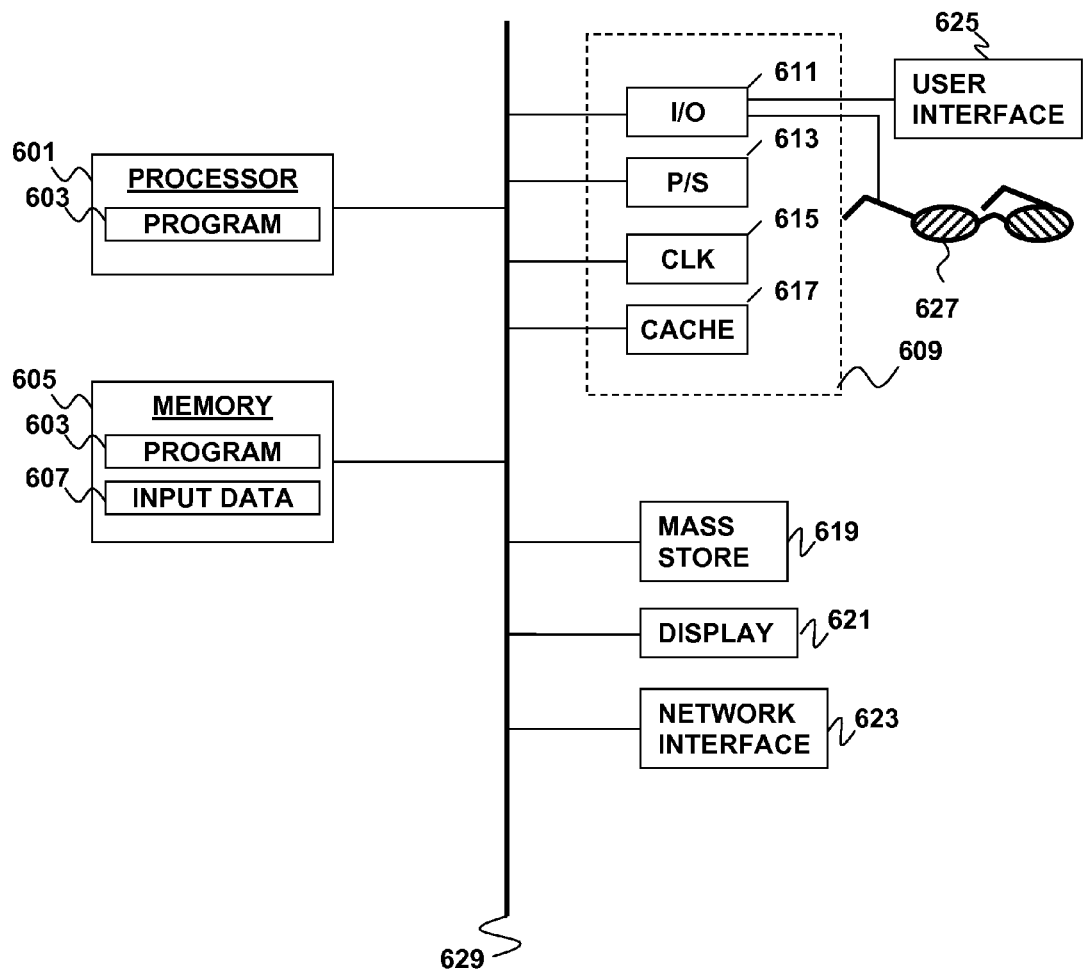
FIG. 6 is a block diagram illustrating an apparatus for multi-sample resolving of a three-dimensional re-projection of a two-dimensional image according to an embodiment of the present invention.

FIG. 6 illustrates a block diagram of a computer apparatus that may be used to implement a method for multi-sample resolving of a three-dimensional re-projection of a two-dimensional image. The apparatus 600 generally may include a processor module 601 and a memory 605. The processor module 601 may include one or more processor cores. An example of a processing system that uses multiple processor modules, is a Cell Processor, examples of which are described in detail, e.g., in *Cell Broadband Engine Architecture*, which is available online at http://www-306.ibm.com/chip/techlib/techlib.nsf/techdocs/1AEEE1270EA2776387257060006E61B A/$file/CBEA_01_pub.pdf, which is incorporated herein by reference.

The memory 605 may be in the form of an integrated circuit, e.g., RAM, DRAM, ROM, and the like. The memory 605 may also be a main memory that is accessible by all of the processor modules. In some embodiments, the processor module 601 may have local memories associated with each core. A program 603 may be stored in the main memory 605 in the form of processor readable instructions that can be executed on the processor modules. The program 603 may be configured to perform multi-sample resolving of a three-dimensional re-projection of a two-dimensional image. The program 603 may be written in any suitable processor readable language, e.g., C, C++, JAVA, Assembly, MATLAB, FORTRAN, and a number of other languages. Input data 607 may also be stored in the memory. Such input data 607 may include information regarding identification of samples to be used and sample coverage amounts. During execution of the program 603, portions of program code and/or data may be loaded into the memory or the local stores of processor cores for parallel processing by multiple processor cores.

The apparatus 600 may also include well-known support functions 609, such as input/output (I/O) elements 611, power supplies (P/S) 613, a clock (CLK) 615, and a cache 617. The apparatus 600 may optionally include a mass storage device 619 such as a disk drive, CD-ROM drive, tape drive, or the like to store programs and/or data. The device 600 may optionally include a display unit 621 and user interface unit 625 to facilitate interaction between the apparatus and a user. By way of example, and not by way of limitation, the display unit 621 may be in the form of a 3-D ready television set that displays text, numerals, graphical symbols, or other visual objects as stereoscopic images to be perceived with a pair of 3-D viewing glasses 627.

The user interface 625 may include a keyboard, mouse, joystick, light pen, or other device that may be used in conjunction with a graphical user interface (GUI). The apparatus 600 may also include a network interface 623 to enable the device to communicate with other devices over a network such as the internet.

The components of the system 600, including the processor 601, memory 605, support functions 609, mass storage device 619, user interface 625, network interface 623, and visual display 621 may be operably connected to each other via one or more data buses 629. These components may be implemented in hardware, software, firmware, or some combination of two or more of these.

There are a number of additional ways to streamline parallel processing with multiple processors in the apparatus. For example, it is possible to "unroll" processing loops, e.g., by replicating code on two or more processor cores and having each processor core implement the code to process a different piece of data. Such an implementation may avoid latency associated with setting up the loop. As applied to our invention, multiple processors could identify two-dimensional samples that correspond to pixels in the three-dimensional re-projection in parallel. Additionally, multiple processors could determine three-dimensional pixel sample coverage amounts in parallel or resolve final colors for three-dimensional pixels in parallel. The ability to process data in parallel saves valuable processing time, leading to a more efficient and streamlined system for multi-sample resolving of a three-dimensional re-projection of a two-dimensional image.

Figure 7:
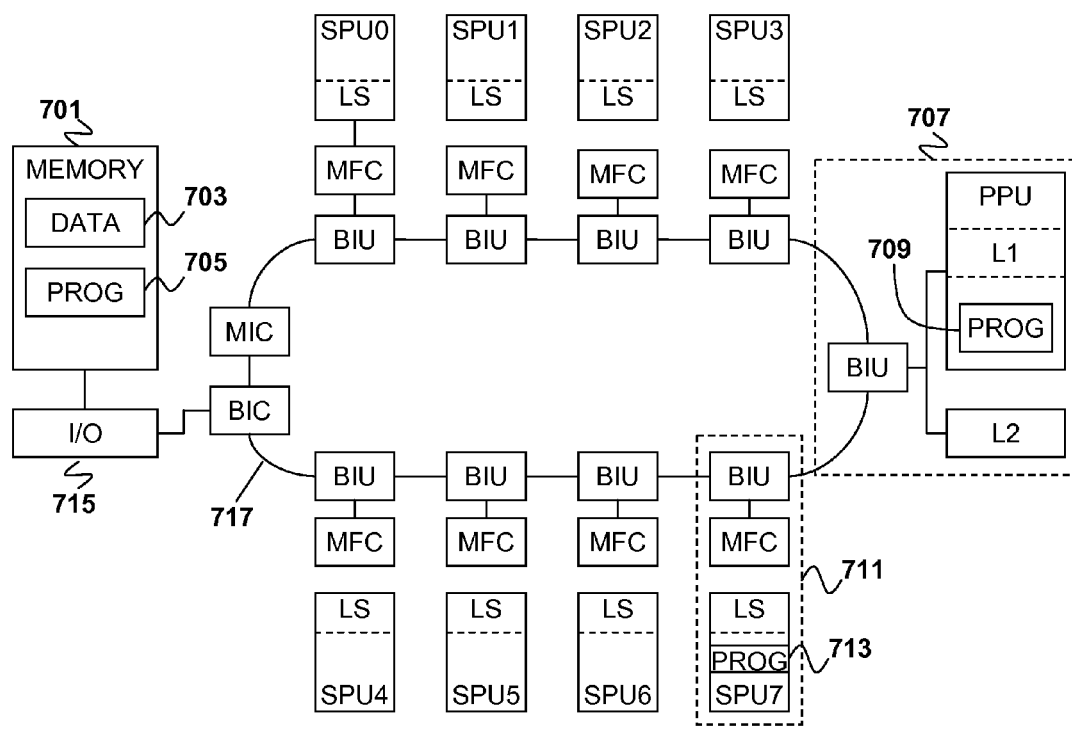
FIG. 7 is a block diagram illustrating an example of a cell processor implementation of an apparatus for multi-sample resolving of a three-dimensional re-projection of a two-dimensional image according to an embodiment of the present invention.

One example, among others of a processing system capable of implementing parallel processing on three or more processors is a cell processor. There are a number of different processor architectures that may be categorized as cell processors. By way of example, and without limitation, FIG. 7 illustrates a type of cell processor. The cell processor 700 includes a main memory 701, a single power processor element (PPE) 707, and eight synergistic processor elements (SPE) 711. Alternatively, the cell processor may be configured with any number of SPEs. With respect to FIG. 7, the memory 701, PPE 707, and SPEs 711 can communicate with each other and with an I/O device 715 over a ring-type interconnect bus 717.

The memory 701 contains input data 703 having features in common with the program described above. At least one of the SPEs 711 may include in its local store (LS) multi-sample resolving of three-dimensional re-projection of two-dimensional image instructions 713 and/or a portion of the input data that is to be processed in parallel, e.g., as described above. The PPE 707 may include in its L1 cache, multi-sample resolving of three-dimensional re-projection of two-dimensional image instructions 709 having features in common with the program described above. Instructions 705 and data 703 may also be stored in memory 701 for access by the SPE 711 and PPE 707 when needed. It should be noted that any number of processes involved in the invented method of multi-sample resolving of a three-dimensional re-projection of a two-dimensional image may be parallelized using the cell processor.

By way of example, the PPE 707 may be a 64-bit PowerPC Processor Unit (PPU) with associated caches. The PPE 707 may include an optional vector multimedia extension unit. Each SPE 711 includes a synergistic processor unit (SPU) and a local store (LS). In some implementations, the local store may have a capacity of e.g., about 256 kilobytes of memory for programs and data. The SPUs are less complex computational units than the PPU, in that they typically do not perform system management functions. The SPUs may have a single instruction, multiple data (SIMD) capability and typically process data and initiate any required data transfers (subject to access properties set up by a PPE) in order to perform their allocated tasks. The SPUs allow the system to implement applications that require a higher computational unit density and can effectively use the provided instruction set. A significant number of SPUs in a system, managed by the PPE allows for cost-effective processing over a wide range of applications By way of example, the cell processor may be characterized by an architecture known as Cell Broadband Engine Architecture (CBEA). In CBEA-compliant architecture, multiple PPEs may be combined into a PPE group and multiple SPEs may be combined into an SPE group. For purposes of example, the cell processor is depicted as having a single SPE group and a single PPE group with a single SPE and a single PPE. Alternatively, a cell processor can include multiple groups of power processor elements (PPE groups) and multiple groups of synergistic processor elements (SPE groups). CBEA-compliant processors are described in detail, e.g., in *Cell Broadband Engine Architecture*, which is incorporated herein by reference and which is available online at https://www-306.ibm.com/chips/techlib/techlib.nsf/techdocs/1AEEE1270EA277638725706000E61B A/$file/CBEA_01_pub.pdf.

According to another embodiment, instructions for multi-sample resolving of a three-dimensional re-projection of a two-dimensional image may be stored in a computer readable storage medium. By way of example, and not by way of limitation, FIG. 8 illustrates an example of a non-transitory computer readable storage medium 800 in accordance with an embodiment of the present invention. The storage medium 800 contains computer-readable instructions stored in a format that can be retrieved, interpreted, and executed by a computer processing device. By way of example, and not by way of limitation, the computer-readable storage medium may be a computer-readable memory, such as random access memory (RAM) or read-only memory (ROM), a computer-readable storage disk for a fixed disk drive (e.g., a hard disk drive), or a removable disk drive. In addition, the computer-readable storage medium 800 may be a flash memory device, a computer-readable tape, a CD-ROM, a DVD-ROM, a Blu-Ray, a HD-DVD, UMD, or other optical storage medium.

The storage medium 800 contains instructions for multi-sample resolving of a three-dimensional re-projection of a two dimensional image 801. The instructions for multi-sample resolving of a three-dimensional re-projection of a two-dimensional image 801 may be configured to implement multi-sample resolving in accordance with the methods described above. In particular, the multi-sample resolving instructions 801 may include identifying two-dimensional sample instructions 803 that are used to determine one or more samples from the two-dimensional image that correspond to a pixel of the three-dimensional re-projection.

The multi-sample resolving instructions 801 may also include determining sample coverage amount instructions 805 that are configured to determine the area a given two-dimensional sample occupies in a three-dimensional pixel. For a three-dimensional re-projection that implements a parallel-camera shift, this sampling is done only in the horizontal direction (i.e., samples are uniform in the vertical direction for any three-dimensional pixel). It is important to note that multi-sampling may be accomplished in any number of different directions.

The multi-sample resolving instructions 801 may also include resolving final pixel color instructions 807 that are configured to determine a three-dimensional pixel color by combining weighted sample coverage amounts. For example, if a given three-dimensional pixel has a red sample with 80% coverage and a blue sample with 20% coverage, then the resolving final pixel color instructions 807 may resolve the three-dimensional pixel color to be a shade of purple with a greater intensity of red due to its higher coverage. It is important to note that any number of weighting methods may be used to resolve a final color based on sample coverage amounts.

The multi-sample resolving instructions 801 may optionally include hole-filling instructions 808 that can adjust the final value for any pixel for which the total weighted coverage amounts for all samples that contributed to that final value is less than 100%, when executed.

The multi-sample resolving instructions 801 may additionally include displaying three-dimensional re-projection instructions 809 that display the three-dimensional re-projection of the two-dimensional image after multi-sample resolving has occurred.

Although examples of implementations have been described in which stereoscopic 3D images are viewed using passive or active 3D viewing glasses, embodiments of the invention are not limited to such implementations. Specifically, embodiments of the invention can be applied to stereoscopic 3D video technologies that do not rely on head tracking or passive or active 3D-viewing glasses. Examples of such "glasses-free" stereoscopic 3D video technologies are sometimes referred to as Autostereoscopic technologies or Autostereoscopy. Examples of such technologies include, but are not limited to, technologies based on the use of lenticular lenses. A lenticular lens is an array of magnifying lenses, designed so that when viewed from slightly different angles, different images are magnified. The different images can be chosen to provide a three-dimensional viewing effect as a lenticular screen is viewed at different angles. The number of images generated increases proportionally to the number of viewpoints for the screen.

More specifically in a lenticular lens video system, re-projection images of a scene from slightly different viewing angles can be generated from an original 2D image and depth information for each pixel in the image. Using re-projection techniques, different views of the scene from progressively different viewing angles can be generated from the original 2D image and depth information. Images representing the different views can be divided into strips and displayed in an interlaced fashion on an autostereoscopic display having a display screen that lies between a lenticular lens array and viewing location. The lenses that make up the lenticular lens can be cylindrical magnifying lenses that are aligned with the strips and generally twice as wide as the strips. A viewer perceives different views of the scene depending on the angle at which the screen is viewed. The different views can be selected to provide the illusion of depth in the scene being displayed.

Furthermore although certain embodiments of the present invention can solve depth tearing issues in the case of three-dimensional re-projection of two-dimensional images and involve generating more than one image for the re-projection, embodiments are more generally applicable to non-3D cases of re-projection. The multi-sample resolving of re-projected pixels described herein can produce a higher image quality in the re-projected image due to the gradient of shift. Such multi-sample resolving can be implemented, e.g., during a typical rasterization of a re-projected image.

In addition, in some three-dimensional implementations it might not be necessary to generate two or more images. For example, in the case of a stereoscopic display it might not be necessary to generate both left-eye and right-eye images via re-projection. Alternatively, one could generate only one new image. For instance it is possible to start with color and depth information for each pixel for a left-eye image and generate the corresponding right-eye image via re-projection (or vice versa) resulting in enough images to display with a stereoscopic display. This would involve generating only a single re-projected image.

While the above is a complete description of the preferred embodiment of the present invention, it is possible to use various alternatives, modifications, and equivalents.

Although the present invention has been described in considerable detail with reference to certain preferred versions thereof, other versions are possible. Therefore, the spirit and scope of the appended claims should not be limited to the description of the preferred versions contained herein. Instead, the scope of the invention should be determined with reference to the appended claims, along with their full scope of equivalents.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. Any feature, whether preferred or not, may be combined with any other feature, whether preferred or not. In the claims that follow, the indefinite article "A", or "An" refers to a quantity of one or more of the item following the article, except where expressly stated otherwise. Any element in a claim that does not explicitly state "means for" performing a specified function, is not to be interpreted as a "means" or "step" clause as specified in 35 USC §112, ¶ 6. In particular, the use of "step of" in the claims herein is not intended to invoke the provisions of 35 USC §112, ¶ 6.

The reader's attention is directed to all papers and documents which are filed concurrently with this specification and which are open to public inspection with this specification, and the contents of any papers and documents incorporated herein by reference.

What is claimed is:

1. A method for multi-sample resolving of a re-projection of a two-dimensional image, the re-projection including a plurality of pixels, the method comprising:
   a) identifying a plurality of samples of the two-dimensional image for each said pixel in the re-projection, wherein each said pixel of the re-projection is generated by shifting the pixel of the re-projection relative to the two-dimensional image by a shift amount that is based on depth information of the two-dimensional image and wherein each two-dimensional sample, when re-projected, has the same width as the pixels of the re-projection;
   b) determining a plurality of sample coverage amounts for each said pixel of the re-projection, wherein each said sample coverage amount is determined from the shift amount of the pixel in the re-projection relative to the two-dimensional image, wherein each said sample coverage amount identifies an area of the pixel covered by the corresponding two-dimensional sample after the shifting; and
   c) resolving a final value for each said pixel of the re-projection by combining each said two-dimensional sample associated with the pixel, wherein each said two dimensional sample associated with the pixel is weighted in accordance with its corresponding sample coverage amount,
   wherein a), b), and c) are performed for at least one of a left eye image and a right eye image for a stereoscopic display.

2. The method of claim 1, wherein identifying each sample in a) is accomplished using a horizontal scan.

3. The method of claim 1, wherein a) involves identifying at most two samples for each pixel in the re-projection.

4. The method of claim 1, wherein b) further includes determining whether a particular sample associated with a pixel in the re-projection has a leading sample in a neighboring pixel.

5. The method of claim 4, wherein b) further includes determining whether a particular sample associated with a pixel in the re-projection has a trailing sample in a neighboring pixel.

6. The method of claim 1, wherein a), b), and c) are performed for both the left-eye and right-eye images for the stereoscopic display.

7. The method of claim 1, wherein the two-dimensional image is the left eye image or the right eye image for the stereoscopic display and a), b), and c) are performed for the other of the left eye image and the right eye image.

8. The method of claim 1, wherein the stereoscopic display is an autostereoscopic display.

9. The method of claim 1, wherein b) includes determining an overlap between two or more samples and wherein c) includes reducing a coverage amount for a sample of the two or more samples having a depth further from a viewer by an amount of coverage overlap with one or more other samples of the two or more samples.

10. The method of claim 1, further comprising adjusting the final value for any pixel for which the total weighted coverage amounts for all samples that contributed to that final value is less than 100%.

11. The method of claim 1, further comprising:
   d) displaying the re-projection on the stereoscopic display.

12. An apparatus for multi-sampling, comprising:
   a processor;
   a memory; and
   computer-coded instructions embodied in the memory and executable by the processor, wherein the computer coded instructions are configured to implement a method for multi-sample resolving of a re-projection of a two-dimensional image, the re-projection including a plurality of pixels, the method comprising:
   a) identifying a plurality of samples of the two-dimensional image corresponding to each said pixel in the re-projection, wherein each said pixel of the re-projection is generated by shifting the pixel of the re-projection relative to the two-dimensional image by a shift amount that is based on depth information of the two-dimensional image and wherein each two-dimensional sample, when re-projected, has the same width as the pixels of the re-projection;
   b) determining a plurality of sample coverage amounts for each said pixel of the re-projection, wherein each said sample coverage amount is determined from the shift amount of the pixel in the re-projection relative to the two-dimensional image, wherein each said sample coverage amount identifies an area of the pixel covered by the corresponding two-dimensional sample after the shifting; and
   c) resolving a final value for each said pixel of the re-projection by combining each said two-dimensional sample associated with the pixel, wherein each said two dimensional sample associated with the pixel is weighted in accordance with its corresponding sample coverage amount,
   wherein a), b), and c) are performed for at least one of a left eye image and a right eye image for a stereoscopic display.

13. The apparatus of claim 12, further comprising a three-dimensional stereoscopic visual display configured to display the re-projection after multi-sample resolving.

14. The apparatus of claim 13, wherein the method further comprises:
   d) displaying the re-projection on the three-dimensional stereoscopic visual display.

15. The apparatus of claim 12, wherein identifying each sample in a) is accomplished using a horizontal scan.

16. The apparatus of claim 12, wherein a) involves identifying at most two samples for each pixel in the re-projection.

17. The apparatus of claim 12, wherein b) further includes determining whether a particular sample associated with a pixel in the re-projection has a leading sample in a neighboring pixel.

18. The apparatus of claim 17, wherein b) further includes determining whether a particular sample associated with a pixel in the re-projection has a trailing sample in a neighboring pixel.

19. The apparatus of claim 12, wherein a), b), and c) are performed for both the left-eye and right-eye images for the stereoscopic display.

20. The apparatus of claim 12, wherein the stereoscopic display is an autostereoscopic display.

21. The apparatus of claim 12, wherein the two-dimensional image is the left eye image or the right eye image for the stereoscopic display and a), b), and c) are performed for the other of the left eye image and the right eye image.

22. The apparatus of claim 12, wherein b) includes determining an overlap between two or more samples and wherein c) includes reducing a coverage amount for a sample of the two or more samples having a depth further from a viewer by an amount of coverage overlap with one or more other samples of the two or more samples.

23. The apparatus of claim 12, wherein the method further comprises adjusting the final value for any pixel for which the total weighted coverage amounts for all samples that contributed to that final value is less than 100%.

24. A computer program product comprising:
a non-transitory, computer-readable storage medium having computer readable program code embodied in said medium for multi-sample resolving of a re-projection of a two-dimensional image, the re-projection including a plurality of pixels, said computer program product having:
a) computer readable program code means for identifying a plurality of samples of the two-dimensional image corresponding to each said pixel in the re-projection, wherein each said pixel of the re-projection is generated by shifting the pixel of the re-projection relative to the two-dimensional image by a shift amount that is based on depth information of the two-dimensional image and wherein each two-dimensional sample, when re-projected, has the same width as the pixels of the re-projection;
b) computer readable program code means for determining a plurality of sample coverage amounts for each said pixel of the re-projection, wherein each said sample coverage amount is determined from the shift amount of the pixel in the re-projection relative to the two-dimensional image, wherein each said sample coverage amount identifies an area of the pixel covered by the corresponding two-dimensional sample after the shifting; and
c) computer readable program code means for resolving a final value for each said pixel of the re-projection by combining each said two-dimensional sample associated the pixel, wherein each said two dimensional sample associated with the pixel is weighted in accordance with its corresponding sample coverage amount.

25. The computer program product of claim 24, wherein identifying each sample in a) is accomplished using a horizontal scan.

26. The computer program product of claim 24, wherein a) involves identifying at most two samples for each pixel in the re-projection.

27. The computer program product of claim 24, wherein b) further includes determining whether a particular sample associated with a pixel in the re-projection has a leading sample in a neighboring pixel.

28. The computer program product of claim 27, wherein b) further includes determining whether a particular sample associated with a pixel in the re-projection has a trailing sample in a neighboring pixel.

29. The computer program product of claim 24, wherein a), b), and c) are performed for both the left-eye and right-eye images for a stereoscopic display.

30. The computer program product of claim 24, wherein the stereoscopic display is an autostereoscopic display.

31. The computer program product of claim 24, wherein the two-dimensional image is the left eye image or the right eye image for the stereoscopic display and a), b), and c) are performed for the other of the left eye image and the right eye image.

32. The computer program product of claim 24, wherein b) includes determining an overlap between two or more samples and wherein c) includes reducing a coverage amount for a sample of the two or more samples having a depth further from a viewer by an amount of coverage overlap with one or more other samples of the two or more samples.

33. The computer program product of claim 24, wherein the method further comprises adjusting the final value for any pixel for which the total weighted coverage amounts for all samples that contributed to that final value is less than 100%.

34. The computer program product of claim 24, further comprising:
d) computer readable program code means for displaying the re-projection on the stereoscopic display.

* * * * *